US011661895B2

(12) United States Patent
Thorup

(10) Patent No.: US 11,661,895 B2
(45) Date of Patent: May 30, 2023

(54) AUTONOMOUS SAFETY MODE FOR DISTRIBUTED CONTROL OF TURBOMACHINES

(71) Applicant: General Electric Company, Schenectady, NY (US)

(72) Inventor: Jessie Thorup, Malden, MA (US)

(73) Assignee: General Electric Comapny, Schenectady, NY (US)

(*) Notice: Subject to any disclaimer, the term of this patent is extended or adjusted under 35 U.S.C. 154(b) by 570 days.

(21) Appl. No.: 16/798,961

(22) Filed: Feb. 24, 2020

(65) Prior Publication Data
US 2021/0262399 A1  Aug. 26, 2021

(51) Int. Cl.
*F02C 9/18* (2006.01)
*B64D 27/10* (2006.01)
*B64D 31/06* (2006.01)
*F02C 9/26* (2006.01)
(Continued)

(52) U.S. Cl.
CPC ............... *F02C 9/18* (2013.01); *B64D 27/10* (2013.01); *B64D 31/06* (2013.01); *F02C 9/20* (2013.01); *F02C 9/26* (2013.01); *G05D 1/0077* (2013.01); *F05D 2270/304* (2013.01); *F05D 2270/44* (2013.01)

(58) Field of Classification Search
CPC . B64D 27/10; B64D 31/06; F02C 9/26; F02C 9/00; G05D 1/0077; F05D 2270/304; F05D 2270/44
See application file for complete search history.

(56) References Cited

U.S. PATENT DOCUMENTS 5,436,826 A * 7/1995 O'Flarity ............. G05D 1/0077
701/100
5,781,398 A 7/1998 Fenske et al.
6,133,846 A 10/2000 Birkedahl et al.
(Continued)

FOREIGN PATENT DOCUMENTS

EP          0541326 A2 *  5/1993
WO    WO2018109903 A1    6/2018

OTHER PUBLICATIONS

English translation of Nagaya (WO 2018109903) (Year: 2018).*
(Continued)

*Primary Examiner* — James M McPherson
*Assistant Examiner* — Kyle J Kingsland
(74) *Attorney, Agent, or Firm* — Dority & Manning, P.A.

(57) ABSTRACT

A distributed control system for a turbomachine and method of operating the distributed control system are provided. In one aspect, a distributed control system includes a central controller and a distributed controller communicatively coupled thereto. The distributed controller has one or more associated local actuators and one or more associated local sensors. The actuators and the sensors are communicatively coupled with the distributed controller. If a communication link between the central controller and the distributed controller becomes faulty, the distributed controller enters an autonomous safety mode. In this mode, the distributed controller uses a combination of its own associated local sensors and past commands received from the central controller to autonomously govern its associated local actuators to maintain safe operation of the turbomachine.

20 Claims, 10 Drawing Sheets

(51) Int. Cl.
F02C 9/20 (2006.01)
G05D 1/00 (2006.01)

(56) References Cited

U.S. PATENT DOCUMENTS

| | | |
|---|---|---|
| 6,516,249 B1 | 2/2003 | Hoyle et al. |
| 6,813,527 B2 | 11/2004 | Hess |
| 6,850,821 B2 | 2/2005 | Weitkamp |
| 7,201,350 B2 | 4/2007 | Sugita et al. |
| 7,253,577 B2 | 8/2007 | Campbell et al. |
| 10,099,796 B2 | 10/2018 | Spack et al. |
| 10,229,016 B2 | 3/2019 | Freydel et al. |
| 2018/0080378 A1* | 3/2018 | Alecu ................. F02C 6/02 |
| 2018/0093778 A1* | 4/2018 | Spack ................. F02C 7/057 |
| 2019/0063331 A1* | 2/2019 | Beauchesne-Martel ................. F02K 3/04 |
| 2021/0163021 A1* | 6/2021 | Frazzoli ............. B60W 50/02 |

OTHER PUBLICATIONS

Shaffer, Distributed Control System for Turbine Engines, Journal of Engineering for Gas Turbines and Power, ASME, Gas Turbines: Controls and Diagnostics, vol. 121, Issue 1, Jan. 1, 1999, 6 Pages. (Abstract Only) http://gasturbinepower.asmedigitalcollection.asme.org/article.aspx?articleid=1420869.

* cited by examiner

| POSITION SCHEDULE 340 ||
|---|---|
| CORRECTED CORE SPEED | SCHEDULED ACTUATOR POSITION |
| $N_{C1}$ | A |
| $N_{C2}$ ⟷ | B |
| $N_{C3}$ | C |
| ⋮ | ⋮ |
| $N_{CN}$ | N |

FIG. 5

AUTONOMOUS SAFETY MODE FOR DISTRIBUTED CONTROL OF TURBOMACHINES

FEDERALLY SPONSORED RESEARCH

This invention was made with Government support under contract number W58RGZ-16-C-0047 awarded by the Department of the Army. The Government has certain rights in this invention.

FIELD

The present subject matter relates generally to distributed control systems for turbomachines, such as gas turbine engines for aerial vehicles.

BACKGROUND

Distributed engine control systems for turbomachines provide a number of benefits over conventional control system architectures. For instance, distributed engine control architectures for turbomachines typically include smaller and lighter hardware, have less complex wiring and improved data sampling rates, and offer localized control of actuators. Typical distributed engine control systems include a central or high-level controller and one or more localized or distributed controllers. Each distributed controller controls one or more distributed actuators or effectors that, when actuated, cause a change in a physical state of the turbomachine. Each distributed controller can be in communication with one or more distributed sensors for receiving feedback. In normal operation, the central controller receives feedback information, e.g., from the distributed sensors and actuators of the system, and governs the actuators for optimizing one or more performance indicators, such as specific fuel consumption, engine responsiveness, etc.

Conventionally, when communication between the central controller and one of the distributor controllers has failed, the distributed controller has commanded its associated one or more distributed actuators to hold a fixed position. Such a control scheme can inadvertently push the turbomachine to an unsafe operating condition. For example, for a gas turbine engine of an aerial vehicle, if a communication failure between the central controller and a distributed controller occurs in the middle of a transient in which the engine is accelerating at a maximum rate, the actuator will remain in the same position and thus the engine may continue accelerating at the maximum rate. This may cause the engine to reach unsafe speeds, torques, and/or temperatures, for example.

Accordingly, distributed engine control systems and methods that address one or more of the challenges noted above would be useful.

BRIEF DESCRIPTION

Aspects of the present disclosure are directed to distributed control systems and methods of controlling turbomachines. Aspects and advantages of the invention will be set forth in part in the following description, or may be obvious from the description, or may be learned through practice of the invention.

In one aspect, a distributed control system for a turbomachine is provided. The distributed control system includes a central controller and a distributed controller communicatively coupled with the central controller. The distributed control system also includes an actuator associated with the distributed controller and communicatively coupled thereto. Further, the distributed control system includes a sensor associated with the distributed controller and communicatively coupled thereto. In response to a detected communication failure between the central controller and the distributed controller, the distributed controller is configured to: access a past command received by the distributed controller from the central controller; receive, from the sensor, sensor data; and cause the actuator to move based at least in part on the accessed past command and the received sensor data.

In another aspect, a method of operating a distributed control system for a turbomachine is provided. The method includes detecting, by a distributed controller communicatively coupled with a central controller, a communication failure between the central controller and the distributed controller. In response to the detected communication failure, the method also includes operating the distributed controller in an autonomous safety mode, wherein operating the distributed controller in the autonomous safety mode comprises: accessing, by the distributed controller, a past command received by the distributed controller from the central controller prior to the detected communication failure, the past command indicative of a parameter value associated with a first operating parameter of the turbomachine; receiving, by the distributed controller from a sensor associated with the distributed controller, sensor data indicative of a parameter value associated with a second operating parameter of the turbomachine; determining, by the distributed controller, a control command indicative of instructions for controlling an actuator associated with the distributed controller and communicatively coupled thereto based at least in part on the accessed past command and the received sensor data; and causing, by the distributed controller, the actuator to move based at least in part on the determined control command.

In a further aspect, a vehicle is provided. The vehicle includes a gas turbine engine. The vehicle also includes a distributed control system operable to control the gas turbine engine during operation. The distributed control system includes a central controller and a distributed control node having a distributed controller, an actuator, and a sensor. Wherein the distributed controller is communicatively coupled with the central controller and the actuator and the sensor are communicatively coupled with the distributed controller. Wherein the distributed controller is configured to: detect a communication failure between the central controller and the distributed controller. Further, in response to the detected communication failure between the central controller and the distributed controller, the distributed controller transitions to an autonomous safety mode in which the distributed controller is configured to: access a past command received by the distributed controller from the central controller, the past command being indicative of a parameter value associated with a first operating parameter of the gas turbine engine; receive, from the sensor, sensor data indicative of a parameter value associated with a second operating parameter of the gas turbine engine; and control movement of the actuator based at least in part on the accessed past command and the received sensor data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 provides an example position schedule for a distributed actuator associated with a distributed controller of the distributed engine control system of FIG. 3;

DETAILED DESCRIPTION

Figure 1:
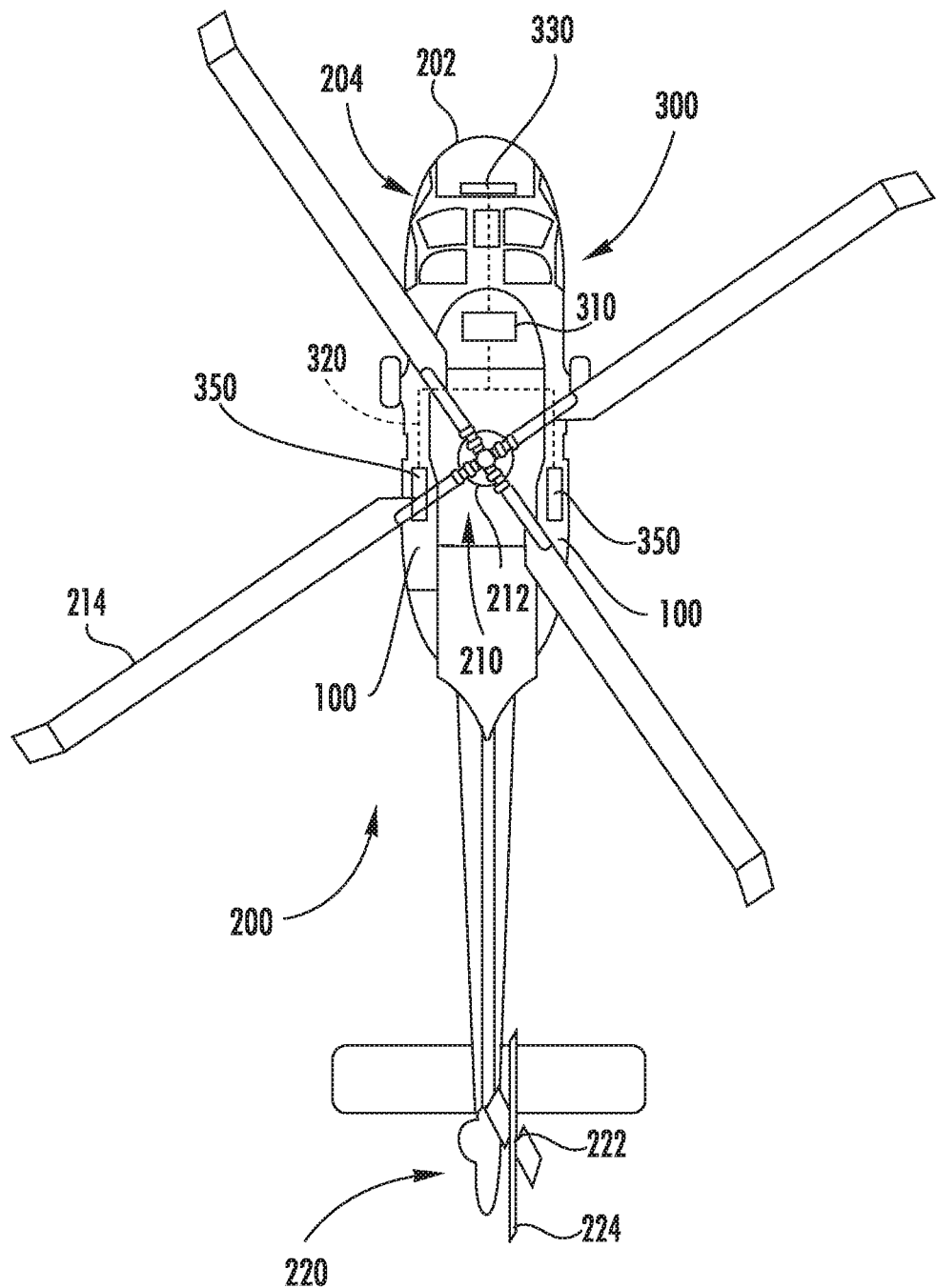
FIG. 1 provides a schematic view of an aircraft according to an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Exemplary aspects of the present disclosure are directed to a distributed control system for a turbomachine and method of operating the distributed control system. In one aspect, a distributed control system includes a central controller and a distributed controller communicatively coupled thereto via a communication link, which can be a wired and/or wireless communication link. The distributed controller has one or more associated local actuators and one or more associated local sensors. The actuators and the sensors are communicatively coupled with the distributed controller. The distributed controller and its associated local actuators and sensors collectively form a distributed control node. The system can have any suitable number of control nodes. If the communication link between the central controller and the distributed controller becomes faulty, the distributed controller enters an autonomous safety mode. In this mode, the distributed controller uses a combination of its own associated local sensors and past commands received from the central controller to autonomously govern its associated local actuators to maintain safe operation of the turbomachine.

In some embodiments, the turbomachine can be a gas turbine engine of an aircraft. Particularly, the gas turbine engine can be a turboshaft engine for a rotorcraft. When the gas turbine engine powers the aircraft in flight and the distributed controller enters the autonomous safety mode due to a communication failure, the distributed control system prevents the gas turbine engine from exceeding limits in speed, torque, and/or temperature while maintaining power to the aircraft. The distributed controller can achieve this by governing fuel to maintain the speed of the engine. The distributed controller can also track and control other actuators to maintain a safe operating condition of the engine, e.g., to prevent stall. By leveraging the local or associated sensors and past commands, the distributed controller can take the best possible action despite the communication failure between the central controller and the distributed controller.

FIG. 1 provides a schematic top view of an aircraft 200 according to an exemplary embodiment of the present disclosure. Particularly, in FIG. 1, the aircraft 200 is a rotorcraft or helicopter. As depicted, the aircraft 200 includes a fuselage or airframe 202 defining a cockpit 204. The cockpit 204 includes a number of flight controls to control the aircraft 200 during flight. A pilot can manipulate or adjust a collective control, a cyclic control, a tail rotor control, a first throttle control, and a second throttle control to the aircraft 200 during operation. The aircraft 200 further includes a main rotor assembly 210 and a tail rotor assembly 220. The main rotor assembly 210 includes a main rotor hub 212 and a plurality of main rotor blades 214. As shown, each main rotor blade 214 extends outwardly from the main rotor hub 212. The tail rotor assembly 220 includes a tail rotor hub 222 and a plurality of tail rotor blades 224. Each tail rotor blade 224 extends outwardly from the tail rotor hub 222.

The aircraft 200 includes a powerplant. Specifically, for this embodiment, the aircraft 200 includes first and second gas turbine engines 100 that may be mechanically coupled to one another such that the first and second gas turbine engines 100 operate together. For example, the gas turbine engines 100 may be ganged together in a gearbox by, e.g., differentials and one-way clutches (such as sprag clutches), such that they operate together. Further, the gas turbine engines 100 may generally generate and transmit power to drive rotation of the main rotor blades 214 and the tail rotor blades 224. In particular, rotation of the main rotor blades 214 generates lift for the aircraft 200, while rotation of the tail rotor blades 224 generates sideward thrust to counteract the torque exerted on the airframe 202 by the main rotor blades 214. The first and second gas turbine engines are turboshaft engines in the depicted embodiment of FIG. 1.

The collective control adjusts a pitch angle of the main rotor blades 214 collectively (i.e., all at the same time) to increase or decrease an amount of lift the aircraft 200 derives from the main rotor blades 214 at a given rotor speed. Accordingly, manipulating the collective control may cause the aircraft 200 to move in one of two opposing directions along the vertical direction (i.e., up and down relative to the ground). The cyclic control controls the forward and back and side-to-side movements of the aircraft 200. In particular, the cyclic control adjusts an angle of the aircraft 200 allowing the aircraft 200 to move forward or backwards or to roll right or left. Additionally, the tail rotor control controls a pitch angle of the tail rotor blades 224. In operation, manipulating the tail rotor control may cause the tail rotor assembly 220 to move such that the orientation or heading of the aircraft 200 is changed. The first and second throttle controls may be moved to an on position at the start of a flight and actuated during the flight to provide a desired amount of power for the aircraft 200. In some embodiments, these controls may be manually actuated or alternatively may be actuated by one or more engine controllers (described below), e.g., in response to and input from the collective control.

Although the aircraft 200 is shown and described herein as having a main/tail rotor configuration, it will be appreciated that the teachings of the present disclosure can apply to other types of aircrafts and vehicles more generally. For example, the aircraft 200 can be any aircraft or vehicle, including but not limited to coaxial rotor helicopters, tandem rotor helicopters, side-by-side rotor helicopters, twin intermeshing rotor helicopters, tilt-rotor aircrafts, an Unmanned Aerial Vehicle (UAV) of an Unmanned Aircraft System (UAS), fixed-wing aircrafts, amphibious vehicles, hovercrafts, land vehicles, etc.

As further shown in FIG. 1, the aircraft 200 includes a vehicle computing system 300 according to an exemplary embodiment of the present disclosure. As shown, the aircraft computing system 300 of exemplary aircraft 200 includes one or more vehicle computing devices represented schematically by vehicle computing device 310. Example vehicle computing devices 310 can include one or more mission computers, a flight management computer of a flight management system, etc. For this embodiment, as noted above, the aircraft 200 includes two engines 100 mounted to or integral with the airframe 202 of the aircraft 200.

Notably, each engine 100 is controlled by a distributed engine control system 350. The distributed engine control systems 350 are configured to control their respective engines 100. As will be explained herein, each distributed engine control system 350 can include a central controller and one or more distributed controllers communicatively coupled with the central controller. The central controller and/or the distributed controllers can each be an Electronic Engine Controller (EEC) or a Digital Engine Controller (DEC). The central controller along with its associated distributed controllers can be part of a Full Authority Digital Engine Control (FADEC) system. Each distributed controller can be communicatively coupled with one or more associated actuators and one or more sensors. In some alternative embodiments, the aircraft 200 can include a single distributed engine control system for controlling both engines 100.

The distributed engine control systems 350 can be communicatively coupled with the one or more vehicle computing devices 310 of vehicle computing system 300. For instance, data can be transmitted between the distributed engine control systems 350 and the vehicle computing devices 310 over a vehicle network 320, e.g., by a wired and/or wireless communication link. Communications can be transmitted using any suitable technique and/or protocol. Vehicle network 320 can be any suitable type of network. The vehicle computing devices 310 and/or the distributed engine control systems 350 can be communicatively coupled with one or more display devices 330 positioned within the cockpit 204, e.g., via vehicle network 320. The display devices 330 can output or display information relating to the engines 100, such as core speed, fuel remaining, exhaust gas temperature, etc.

Figure 2:
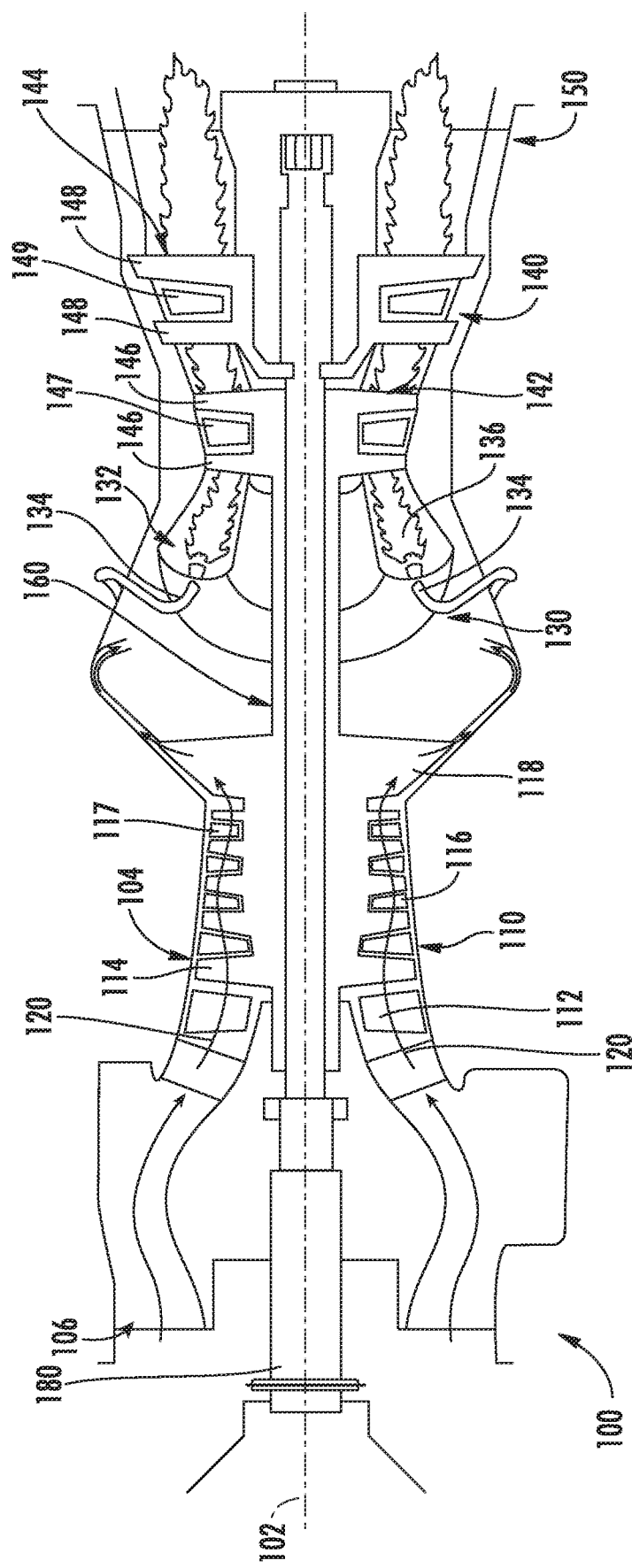
FIG. 2 provides a schematic cross-sectional view of an exemplary gas turbine engine of the aircraft of FIG. 1 according to an exemplary embodiment of the present disclosure.

FIG. 2 provides a schematic cross-sectional view of one of turbine engines 100 of the aircraft 200 of FIG. 1 according to an exemplary embodiment of the present disclosure. As shown, the gas turbine engine 100 defines a longitudinal or centerline axis 102. The gas turbine engine 100 includes a substantially tubular outer casing 104 that defines an annular inlet 106. The outer casing 104 can be formed from a single casing or multiple casings. The outer casing 104 encloses, in serial flow relationship, a compressor 110, a combustion section 130, a turbine 140, and an exhaust section 150. The compressor 110 includes an annular array of inlet guide vanes 112, one or more sequential arrays of compressor blades 114, one or more sequential arrays of variable stator vanes 116, one or more sequential arrays of stationary compressor vanes 117, and an impeller or centrifugal compressor 118. Collectively, the compressor blades 114, variable stator vanes 116, stationary compressor vanes 117, and the centrifugal compressor 118 define a compressed air path 120.

The combustion section 130 includes a combustor defining a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine 140.

The turbine 140 includes an HP turbine 142 and a LP turbine 144 positioned downstream of the HP turbine 142. The HP turbine 142 includes one or more sequential arrays of turbine rotor blades 146 and one or more sequential arrays of stator vanes 147. Likewise, the LP turbine 144 includes one or more sequential arrays of turbine rotor blades 148 and one or more sequential arrays of stator vanes 149. As will be explained below, the HP turbine 142 and LP turbine 144 drive a shaft 160 that in turn drives an output shaft 180 operatively coupled thereto.

As shown in the embodiment depicted in FIG. 2, the gas turbine engine 100 is a single spool turboshaft engine. Accordingly, the compressor 110, the HP turbine 142, and the LP turbine are coupled to one another via the shaft 160. In operation, expansion of the combustion gases 136 drives both the HP turbine 142 and the LP turbine 144 around the centerline axis 102, causing the shaft 160 to rotate along with the compressor 110. Further, as the single spool rotates, the shaft 160 transfers rotational energy to the output shaft 180. The output shaft 180 can be mechanically coupled with the main rotor 210 (FIG. 1) and/or the tail rotor 220 (FIG. 1) of the aircraft 200 (FIG. 1) to produce propulsive thrust.

Although one or more gas turbine engines configured in a turboshaft configuration are shown and described herein as the powerplant for the exemplary aircraft 200, it will be appreciated that the teachings of the present disclosure can apply to other types of powerplants. For example, the powerplant can include one or more gas turbine engines having a different configuration, such as e.g., a turboprop or turbofan gas turbine engine. As another example, the powerplant can be a piston-driven combustion engine, a hybrid electric propulsion system, or an electric propulsion system. Other suitable powerplants are contemplated.

Figure 3:
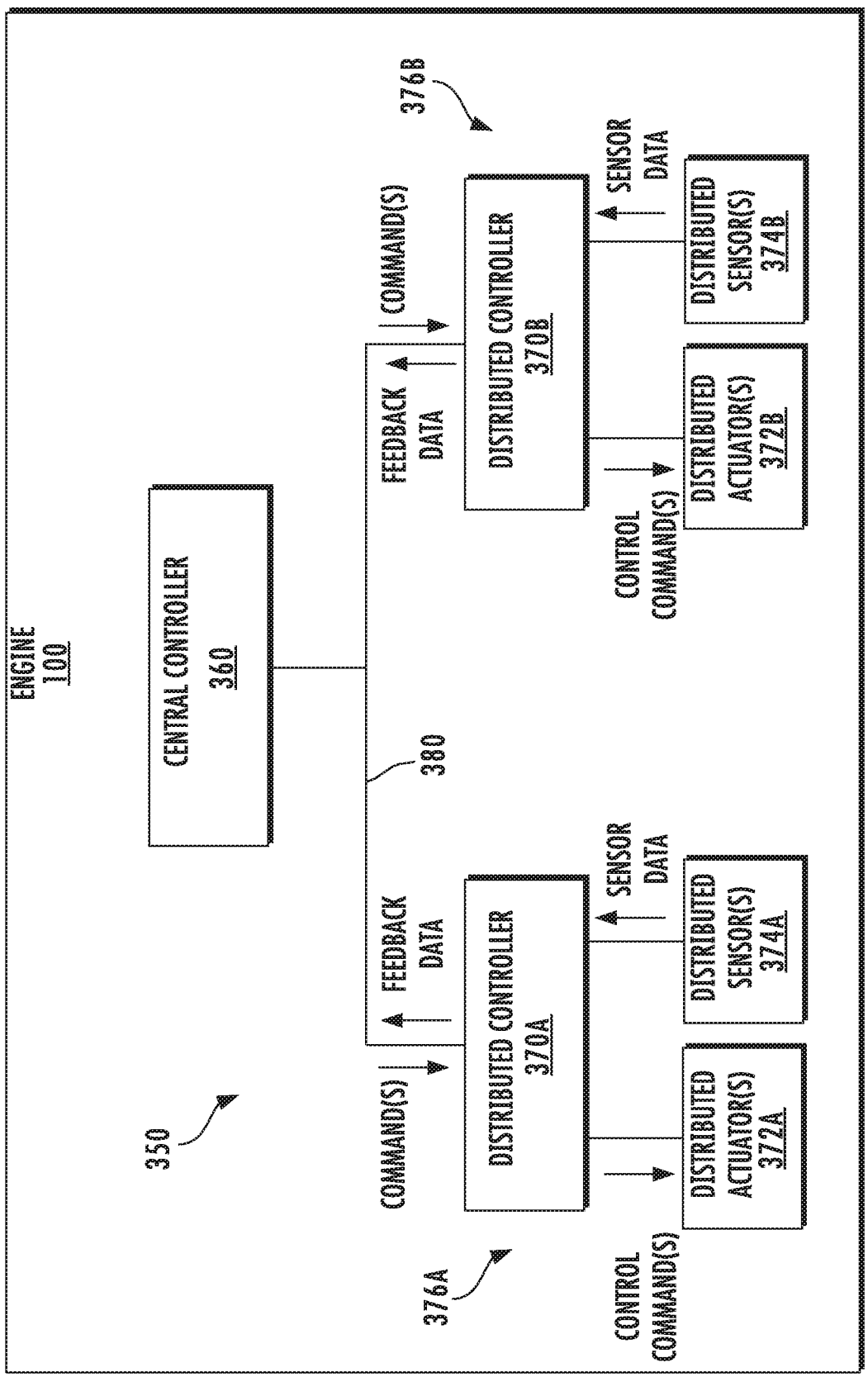
FIG. 3 provides a schematic view of a distributed engine control system associated with one of the engines of the aircraft of FIG. 1 according to an exemplary embodiment of the present disclosure.

FIG. 3 provides a schematic view of one of the distributed engine control systems 350 associated with one of the engines 100 of the aircraft 200 of FIG. 1. Generally, the distributed engine control system 350 is configured to control its associated engine 100. The distributed engine control system 350 includes a high-level or central controller 360 and one or more low-level or distributed controllers communicatively coupled thereto via a communication link 380, e.g., via a wired and/or wireless connection. For this embodiment, the distributed engine control system 350 includes a first distributed controller 370A and a second distributed controller 370B. In some alternative embodiments, the distributed engine control system 350 can include a single distributed controller or more than two (2) distributed controllers. Accordingly, any suitable number of distributed controllers can be communicatively coupled with the central controller 360.

Each distributed controller 370A, 370B can have one or more associated distributed actuators and one or more associated distributed sensors. For instance, for this embodiment, the first distributed controller 370A has one or more associated first distributed actuators 372A and one or more associated first distributed sensors 374A. Collectively, the first distributed controller 370A, the first distributed actuators 372A, and the first distributed sensors 374A form a first control node 376A of the distributed engine control systems 350. Similarly, the second distributed controller 370B has one or more associated second distributed actuators 372B and one or more associated second distributed sensors 374B. Collectively, the second distributed controller 370B, the second distributed actuators 372B, and the second distributed sensors 374B form a second control node 376B of the distributed engine control systems 350. In some alternative embodiments, the distributed engine control system 350 can include a single control node containing a distributed controller and associated actuator(s) and sensor(s) or more than two (2) distributed control nodes. Accordingly, the distributed engine control system 350 can include any suitable number of distributed control nodes.

Example distributed actuators associated with the first distributed controller 370A and/or second distributed controller 370B can include, without limitation, a fuel flow actuator, a variable geometry actuator, a bleed valve actuator, a clearance control actuator, and/or a variable exhaust nozzle actuator. The fuel flow actuator, when commanded to actuate, can change a fuel flow into the combustion chamber 132 defined by the combustor (FIG. 2). The variable geometry actuator, when commanded to actuate, can change a mass flow through the engine 100. For instance, the variable geometry actuator can cause one or both of the inlet guide vanes 122 (FIG. 2) and the variable stator vanes 116 (FIG. 2) of the compressor 110 (FIG. 2) to actuate such that the mass flow through the core air flowpath is changed. The bleed valve actuator, when commanded to actuate, can change the mass flow through the through the engine 100. The clearance control actuator, when commanded to actuate, can change or adjust a clearance gap between a rotating component and a stationary component. For instance, the clearance control actuator, when commanded to actuate, can adjust a clearance gap between a rotating turbine blade and a stationary shroud. The variable exhaust nozzle actuator, when commanded to actuate, can change or alter the exhaust flow from the engine, e.g., for optimizing the thrust output of the engine.

In some embodiments, the first distributed actuators 372A can include at least one of a fuel flow actuator, a variable geometry actuator, and a bleed valve actuator. In some embodiments, the first distributed actuators 372A can include a fuel flow actuator, a variable geometry actuator, and a bleed valve actuator. In some embodiments, the first distributed actuators 372A can include a clearance control actuator. In some other embodiments, the first distributed actuators 372A can include a variable exhaust nozzle actuator. Example distributed sensors associated with the first distributed controller 370A and/or second distributed controller 370B can include, without limitation, a core speed sensor, temperature sensors, pressure sensors, torque sensors, and/or other suitable sensors.

During normal operation, the distributed engine control system 350 can control the engine 100 in the following example manner. Generally, during normal operation, the central controller 360 controls operation of the engine 100. In response to one or more pilot inputs (e.g., an adjustment of a power lever or throttle) and/or automatic flight management system inputs as well as feedback data, the central controller 360 sends command(s) to the distributed controllers 370A, 370B. For example, the command(s) can include an inlet temperature (e.g., the temperature at core inlet 106 depicted in FIG. 2), a core speed reference target or setpoint, and/or other information that may be useful to the distributed controllers 370A, 370B in controlling their respective actuators 372A, 372B, e.g., to achieve a desired target setpoint. The feedback data can include sensor data indicative of an operating condition or physical state of the engine 100 (e.g., a temperature, pressure, etc. at a station of the engine 100), a current position of the distributed actuators 372A, 372B, as well as other information that may be useful to the central controller 360 in generating the commands sent to the distributed controllers 370A, 370B. Based at least in part on the received commands and sensor data, the distributed controller 370A, 370B can send control commands to their respective distributed actuators 372A, 372B, e.g., to cause a change in an operation state of the engine 100.

In some instances during operation, a communication failure between one or more of the distributed controllers 370A, 370B and the central controller 360 can occur. In such an instance, the distributed controller that has lost communication with the central controller 360 can activate or enter an autonomous safety mode. In the autonomous safety mode, the distributed controller that has lost communication with the central controller 360 is given the authority to control its associated actuators autonomously without receiving commands from the central controller 360. The distributed controller that has lost communication with the central controller 360 can use all available information, including local sensor data and information previously sent from the central controller 360. In this way, the distributed controller that has lost communication with the central controller 360 can govern its associated actuators to stay within turbomachine operational limits and maintain a safe condition.

Figure 4:
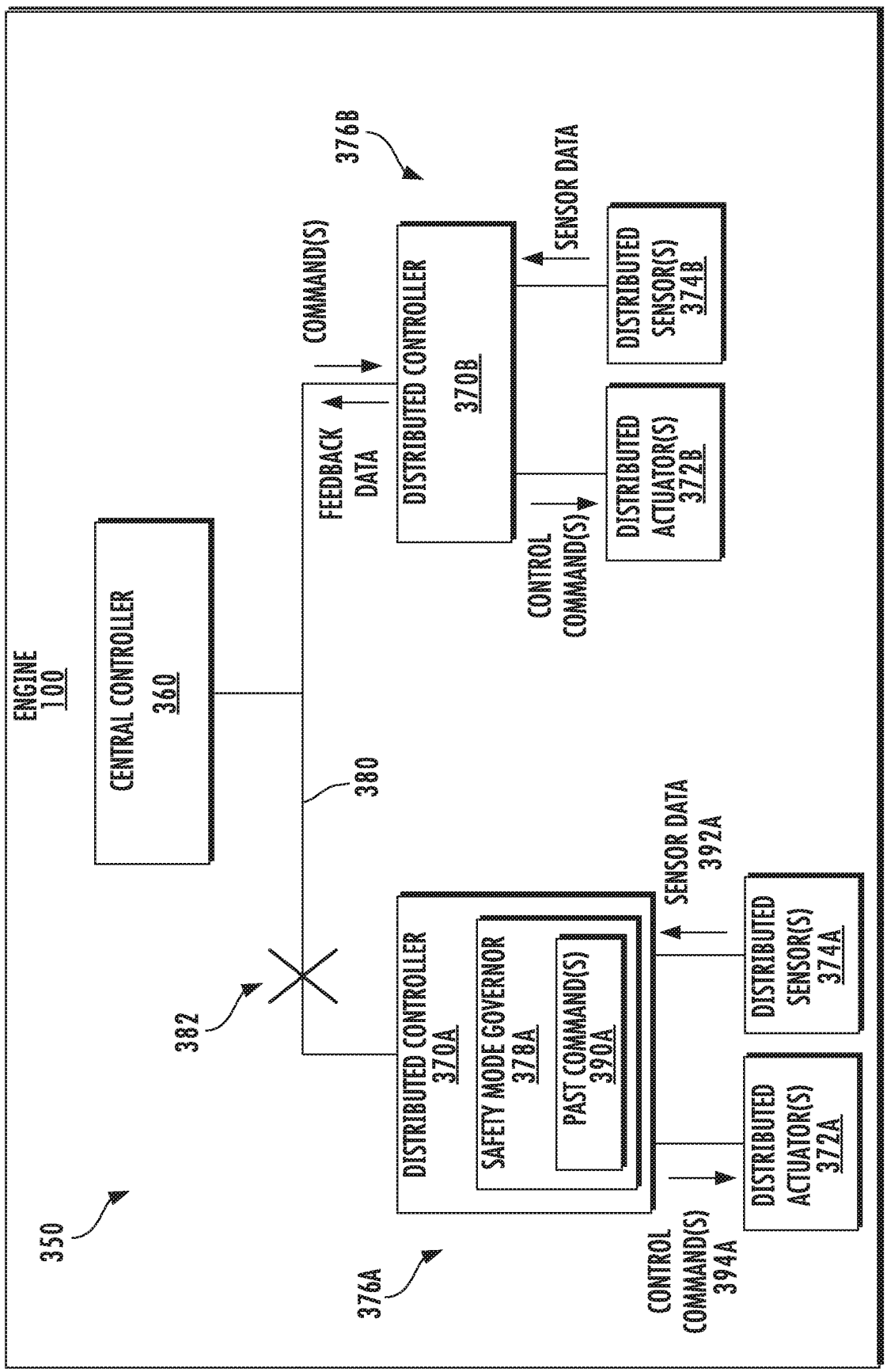
FIG. 4 provides a schematic view of the distributed engine control system of FIG. 3 and depicts one of the distributed controllers operating in an autonomous safety mode.

FIG. 4 provides a schematic view of the distributed engine control system 350 of FIG. 3 and depicts one of the distributed controllers operating in an autonomous safety mode. As denoted by the "X" in FIG. 4, a communication failure 382 has occurred between the first distributed controller 370A and the central controller 360 during operation of the engine 100. The first distributed controller 370A can detect the communication failure 382 between the central controller 360 and the first distributed controller 370A. The first distributed controller 370A can detect that a communication failure has occurred in any suitable manner. For instance, the first distributed controller 370A can detect a communication failure by determining that there no further signals or commands are being received from the central controller 360, that the same signal or command is being received for a predetermined time thereby indicating a faulty communication link, and/or if the signal or information contained within the command is outside of a predetermined range.

In response to the detected communication failure 382 between the central controller 360 and the first distributed controller 370A, the first distributed controller 370A enters, activates, or otherwise transitions to an autonomous safety mode. In the autonomous safety mode, the first distributed controller 370A controls its associated first distributed actuators 372A autonomously to maintain the engine 100 within operational limits to maintain a safe condition despite not receiving commands from the central controller 360.

Each of the distributed controllers 370A, 370B can include safety mode governors that provide autonomous safety mode functionality to their respective distributed controllers. For instance, as depicted in FIG. 4, the first distributed controller 370A is includes a first safety mode governor 378A. The first safety mode governor 378A can include control logic, programmable instructions, etc. for governing the first distributed controller 370A in the autonomous safety mode. Upon detection or determination of a communication failure, the affected distributed controller can nearly instantaneously (on the order of microseconds) transition to the autonomous safety mode.

In the autonomous safety mode, the distributed controller that has lost communication with the central controller 360 can utilize information available to it to ensure the engine 100 is operating in a safe condition. Particularly, in the autonomous safety mode, the first distributed controller 370A is configured to access one or more past commands 390A received by the first distributed controller 370A from the central controller 360. That is, the first distributed controller 370A accesses one or more stored commands received by the first distributed controller 370A from the central controller 360 prior to the communication failure 382. More specifically, as the first distributed controller 370A receives commands from the central controller 360 during normal operation, the first distributed controller 370A can store the received commands in one or memory devices of the first distributed controller 370A, such as a buffer device. The received commands can be stored in the buffer device on a rolling basis, for example. As the stored commands are no longer current when the first distributed controller 370A accesses them in the autonomous safety mode, the commands are denoted herein as past commands 390A.

In some embodiments, the past commands 390A are indicative of parameter values associated with a first operating parameter of the engine 100. As one example, the engine 100 can define an inlet 106 (FIG. 2) and can have a spool rotatable about an axis of rotation (e.g., the shaft 160, the compressor 110, and the turbine 140 collectively form a spool rotatable about the centerline axis 102 as shown in FIG. 2). In such embodiments, the parameter values associated with the first operating parameter of the turbomachine can be inlet temperatures at the inlet 106 of the engine 100. Stated another way, the first operating parameter can be an inlet temperature of the engine 100 at the inlet 106 and the parameter values can be the actual temperature values sensed and/or calculated at the inlet 106. In other embodiments, the first operating parameter can be another suitable parameter indicative of the operating conditions of the engine 100 during operation. The past commands 390A can also include other data, such as reference or target core speeds, temperatures, pressures, etc.

After accessing the past commands 390A, the first distributed controller 370A determines or selects one or more parameter values to utilize in controlling the associated first distributed actuators 372A during the autonomous safety mode. In some embodiments, the parameter value selected by the first distributed controller 370A for use in controlling the first distributed actuators 372A is contained within the last command received by the first distributed controller 370A from the central controller 360 prior to the detected communication failure 382. For example, in embodiments in which the first operating parameter is the inlet temperature at inlet 106, the parameter value utilized by the first distributed controller 370A can be the sensed or calculated inlet temperature contained within the last command received by the first distributed controller 370A prior to the communication failure 382.

In some other embodiments, the parameter value selected by the first distributed controller 370A for use in controlling the first distributed actuators 372A is contained within a command received by the first distributed controller 370A from the central controller 360 prior to the detected communication failure 382 that has a confidence score greater than a predetermined threshold. Particularly, in such embodiments, the first distributed controller 370A can assign confidence scores to each parameter value of the stored past commands 390A. For instance, the confidence scores can range from zero to one hundred and the predetermined threshold can be a score of seventy. With confidence scores assigned to the parameter values associated with the first operating parameter, the first distributed controller 370A can determine the most recent parameter value that has a confidence score greater than the predetermined threshold. The first distributed controller 370A can select the determined most recent parameter value that has a confidence score greater than the predetermined threshold as the parameter value to utilize in controlling the associated first distributed actuators 372A during the autonomous safety mode.

Further, in the autonomous safety mode, the first distributed controller 370A is configured to receive, from the first distributed sensors 374A, sensor data 392A. In some embodiments, the sensor data 392A is indicative of parameter values associated with a second operating parameter of the engine 100. As one example, the parameter values associated with the second operating parameter of the engine 100 can be a sensed core speed of the spool of the engine 100. Accordingly, the first distributed sensors 374A can include a speed sensor operable to sense the rotational core speed of the spool of the engine 100. The first distributed sensors 374A can continuously sample or sense the core speed and the first distributed controller 374A can receive sensor data 392A is indicative of the sensed core speeds. In other embodiments, the second operating parameter can be another suitable parameter indicative of the operating conditions of the engine 100 during operation. For instance, the sensor data can be indicative of a fan speed in embodiments in which the turbomachine includes a fan, a torque output, a compressor discharge pressure, and/or some other suitable parameter indicative of the operating conditions of the engine 100.

In the autonomous safety mode, the first distributed controller 370A can control movement of its associated first distributor actuators 372A based at least in part on the accessed past commands 390A and the received sensor data 392A. That is, the first distributed controller 370A can cause one or more of the first distributor actuators 372A to move based at least in part on the accessed past command 390A stored in a memory device of the first distributed controller 370A and the received sensor data 392A sensed by the one or more first distributed sensors 374A.

In some embodiments, in controlling movement of the first distributed actuators 372A based at least in part on the accessed past commands 390A and the received sensor data 392A, the first distributed controller 370A is configured to determine a calculated value based at least in part on the parameter value associated with the first operating parameter and the parameter value associated with the second operating parameter of the engine 100. As one example, the parameter value associated with the first operating parameter of the engine 100 can be an inlet temperature at the inlet 106 (FIG. 2) of the engine 100, the parameter value associated with the second operating parameter of the engine 100 can be a sensed core speed of the spool (e.g., the shaft 160, the compressor 110, and the turbine 140 collectively form the spool of the engine 100; FIG. 2), and the calculated value is indicative of a corrected core speed of the engine 100. In such an example, the first distributed controller 370A can determine corrected core speed of the engine 100 based on the inlet temperature and the sensed core speed. Stated another way, the measured core speed can be corrected to a standard day condition. Although the inlet temperature is not a recent parameter value as it extracted from the past commands 390A, it can be assumed that the inlet temperature of the engine 100 does not change substantially or drastically.

With the calculated value determined, or in this example the corrected core speed of the turboshaft engine 100 of FIG. 2, the first distributed controller 370A is configured to correlate the determined calculated value with a scheduled actuator position associated with the determined calculated value. For instance, the first distributed controller 370A can correlate the determined corrected core speed to a scheduled actuator position associated with the determined corrected core speed.

With reference now to FIGS. 4 and 5, FIG. 5 provides an example position schedule 340 for one of the first distributed actuators 372A. As depicted in FIG. 5, the position schedule 340 correlates corrected core speeds with scheduled actuator positions. As illustrated, a corrected core speed $N_{C1}$ corresponds with an actuator position A, a corrected core speed $N_{C2}$ corresponds with an actuator position B, a corrected core speed $N_{C3}$ corresponds with an actuator position C, and so on such that a corrected core speed $N_{CN}$ corresponds with an Nth actuator position N. In this example, if the corrected core speed is determined as the corrected core speed $N_{C2}$, the first distributed controller 370A correlates the corrected core speed $N_{C2}$ with the scheduled actuator position associated with the corrected core speed $N_{C2}$, which in this example is the actuator position B as shown in FIG. 5. The position schedule 340 can be stored in one or more memory devices and/or memory locations of the first distributed controller 370A. Each actuator of the first distributed actuators 372A can have an associated position schedule.

Referring again to FIG. 4, once the determined corrected core speed is correlated with an associated scheduled actuator position, the first distributed controller 370A is further configured to determine one or more control commands 394A indicative of instructions for actuating the one or more first distributed actuators 372A based at least in part on the correlated scheduled actuator positions. For example, based on position feedback received by the first distributed controller 370A (e.g., from the first distributed actuators 372A and/or the first distributed sensors 374A) and the correlated scheduled actuator positions, the first distributed controllers 370A can determine control commands that, when executed by the first distributed actuators 372A, cause the first distributed actuators 372A to move toward their respective correlated scheduled actuator positions. The safety mode governor 378A can utilize a closed loop to modulate the first distributor actuators 372A toward or to the correlated scheduled actuator positions.

In some embodiments, when the first distributed controller 172A is operating in the autonomous safety mode, the first distributed controller 172A is configured to detect a restored communication between the central controller 360 and the first distributed controller 370A. That is, the first distributed controller 370A is configured to monitor for a restored communication between itself and the central controller 360. In response to the detected restored communication between the central controller 360 and the first distributed controller 370A, the first distributed controller 370A transitions from the autonomous safety mode to a normal mode in which the distributed controller is configured to send, to the central controller 360, data indicative of a current actuator position of the one or more first distributed actuators 372A. In this way, the central controller 360 can efficiently take command of controlling the first distributed controller 370A and its associated first distributed actuators 372A. Although first distributed controller 370A was described herein as operating in the autonomous safety mode in response to the communication failure 382, it will be appreciated that the second distributed controller 370B can also be operated in the autonomous safety mode in response to a communication failure between the second distributed controller 370B and the central controller 360. In some embodiments, for example, the central controller 360 can fail and the first distributed controller 370A and the second distributed controller 370B can be operated in the autonomous safety mode simultaneously. In other embodiments, the second distributed controller 370B can be operated in the autonomous safety mode while the first distributed controller 370A resumes operation in normal mode.

Advantageously, by leveraging the local or associated first distributed sensors 374A and past commands 390A, the first distributed controller 370A can take the best possible action despite the communication failure 382 between the central controller 360 and the first distributed controller 370A. In the autonomous safety mode, the first distributed controller 170A can control the available actuator(s) to ensure that the engine 100 meets its in-flight requirements of maintaining power and staying within speed, torque, and temperature limits even after the communication failure 382.

Figure 6A:
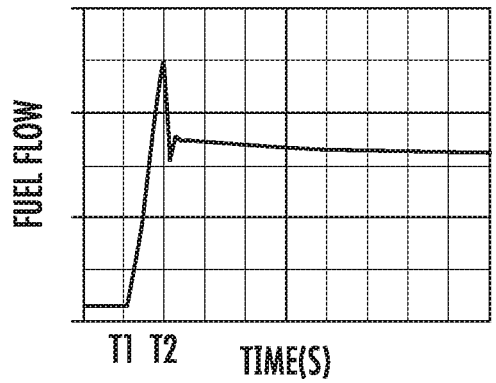
FIG. 6A depicts fuel flow as a function of time for an engine controlled by a distributed engine control system of the present disclosure.
Figure 6B:
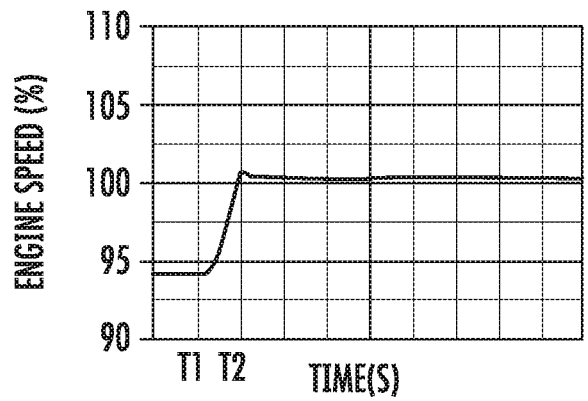
FIG. 6B depicts a graph corresponding to the graph of FIG. 6A and illustrates engine speed as a function of time over the same time period depicted in FIG. 6A.

The advantages of the distributed engine control system 350 described herein are illustrated graphically in FIGS. 6A and 6B. FIG. 6A depicts fuel flow as a function of time and FIG. 6B depicts a corresponding graph illustrating engine speed as a function of time over the same time period. Reference will also be made to elements of FIG. 4 to provide context. As shown in FIG. 6A, at time T1, the engine 100 transitions from steady state operation to transient operation, and accordingly, fuel flow is increased to the engine to produce the desired increased thrust output. Before time T2, a communication failure between the central controller 360 and the first distributed controller 370A occurs. In accordance with the inventive aspects of the present disclosure, the first distributed controller 370A transitions to the autonomous safety mode to maintain safe operation of the engine 100. The first distributed controller 370A, using the past commands 390A and sensor data 392A, controls the first distributed actuators 372A via control commands 394A. As illustrated at time T2, the fuel flow is decreased, e.g., by a fuel flow actuator of the first distributed actuators 372A. As shown in FIG. 6B, by controlling the first distributed actuators 372A in the safety mode, the first distributed controller 370A can prevent the engine speed from increasing significantly over an engine speed of 100% as shown in FIG. 6B. Particularly, the first distributed controller 370A can control its associated first distributed actuators 372A such that the engine speed is maintained at about 100% despite loss of communication with the central controller 360. Accordingly, a safe condition of the engine is maintained.

Figure 7A:
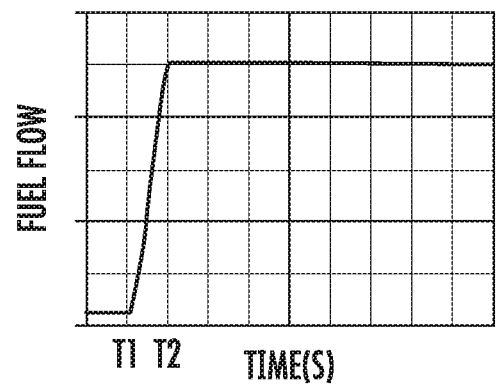
FIG. 7A depicts fuel flow as a function of time for an engine controlled by a conventional distributed engine control system.
Figure 7B:
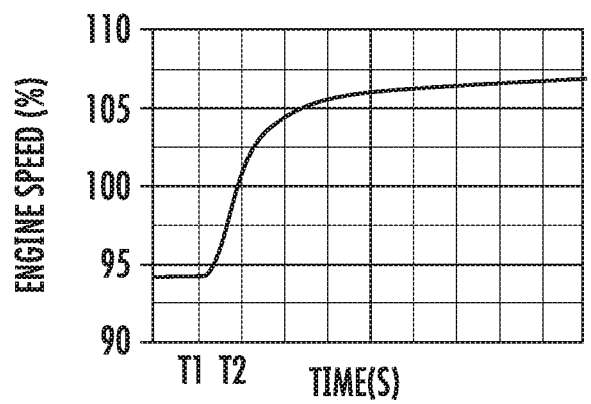
FIG. 7B depicts a graph corresponding to the graph of FIG. 7A and illustrates engine speed as a function of time over the same time period depicted in FIG. 7A.

For comparison purposes, FIGS. 7A and 7B provide graphs depicting how conventional or prior art distributed engine control systems respond to a communication failure. FIG. 7A depicts fuel flow as a function of time and FIG. 7B depicts a corresponding graph illustrating engine speed as a function of time over the same time period. As shown in FIG. 7A, at time T1, the engine transitions from steady state operation to transient operation, and accordingly, fuel flow is increased to the engine to produce the desired increased thrust output. Before time T2, a communication failure between a central controller and a distributed controller occurs. In response to the communication failure, the distributed controller causes its associated actuator to remain in a fixed position. For instance, a fuel flow actuator associated with the distributed controller can remain in a fixed position, and accordingly, the fuel flow remains constant after time T2. As shown in FIG. 7B, by keeping the fuel flow actuator in a fixed position in response to the communication failure, the engine speed increases to unsafe operating levels. In this example, the engine speed increases to over 105%. This, as noted herein, can damage engine components, reduce the Time-On-Wing (TOW) of the engine, and in some cases, can cause catastrophic failure of the engine.

Figure 8:
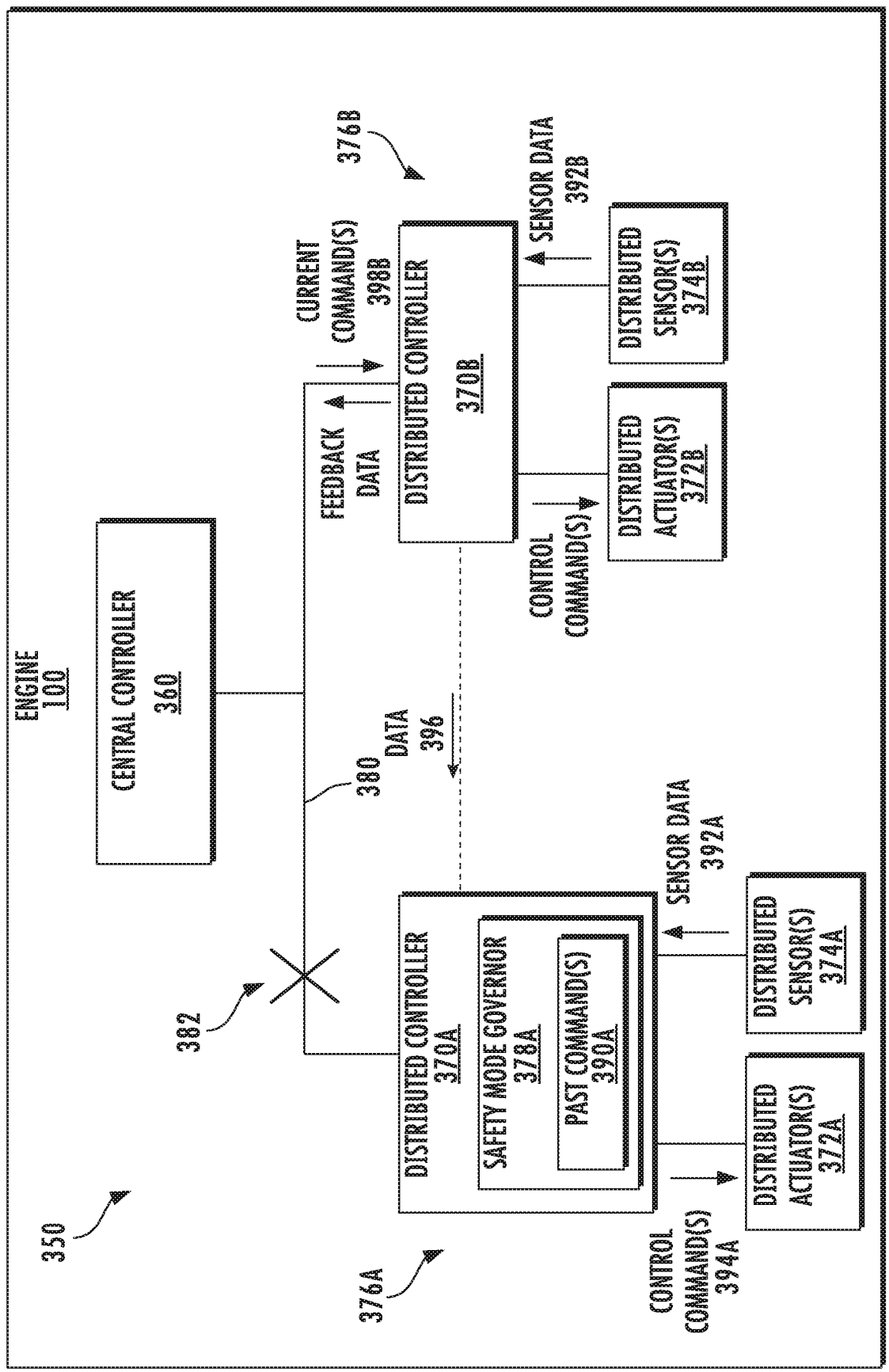
FIG. 8 provides a schematic view of a distributed engine control system that can be used to control a turbomachine according to an exemplary embodiment of the present disclosure.

FIG. 8 provides a schematic view of a distributed engine control system 350 that can be used to control a turbomachine according to an exemplary embodiment of the present disclosure. For instance, the distributed engine control system 350 of FIG. 8 can be used to control one or both of the turboshaft engines 100 of the aircraft 200 of FIG. 1. The distributed engine control system 350 of FIG. 8 is similarly configured as the distributed engine control system 350 of FIGS. 3 and 4 except as provided below.

As noted previously, the second distributed controller 370B is communicatively coupled with the central controller 360 and the first distributed controller 370A is communicatively coupled with the central controller 360. For this embodiment, however, the second distributed controller 370B of the second control node 376B is communicatively coupled with the first distributed controller 370A of the first control node 376A. In such embodiments, in response to a detected communication failure 382 between the central controller 360 and the first distributed controller 370A, the first distributed controller 370A is configured to receive, from the second distributed controller 370B, or more broadly the second control node 376B, data 396 indicative of a parameter value associated with a third operating parameter of the turbomachine. The third operating parameter of the turbomachine can be any suitable parameter that indicates an operating condition of the turbomachine, such as a temperature, a pressure, a torque output, etc.

In some embodiments, the parameter values associated with the third operating parameter contained within the data 396 can be sensed parameters. For instance, the parameter values can be values sensed by the one or more second distributed sensors 374B. Accordingly, the data 396 can include sensor data 392B. Thus, in such embodiments, the first distributed controller 370A can leverage distributed sensors of other control nodes to control its associated first distributed actuators 372A. Additionally or alternatively, the parameter values associated with the third operating parameter contained within the data 396 can be extracted from current commands 398B received by the second distributed controller 370B from the central controller 360. Accordingly, the data 396 can include current commands 398B. Thus, in such embodiments, the first distributed controller 370A can leverage current commands 398B sent from central controller 360 to other control nodes to control its associated first distributed actuators 372A.

In addition to utilizing past commands 390A and sensor data 392A, the first distributed controller 370A can cause the first distributed actuators 372A to move their respective positions based at least in part on the received data indicative of the parameter value associated with the third operating parameter of the turbomachine. By utilizing such information, the first distributed controller 370A can leverage current commands 398A and/or sensor data 392B of the second control node 376B, which may provide more precise control of the first distributed actuators 372A. The distributed controller that has lost communication with the central controller 360 can leverage data from one, some, or all of the other control nodes of the distributed engine control system 350.

Figure 9:
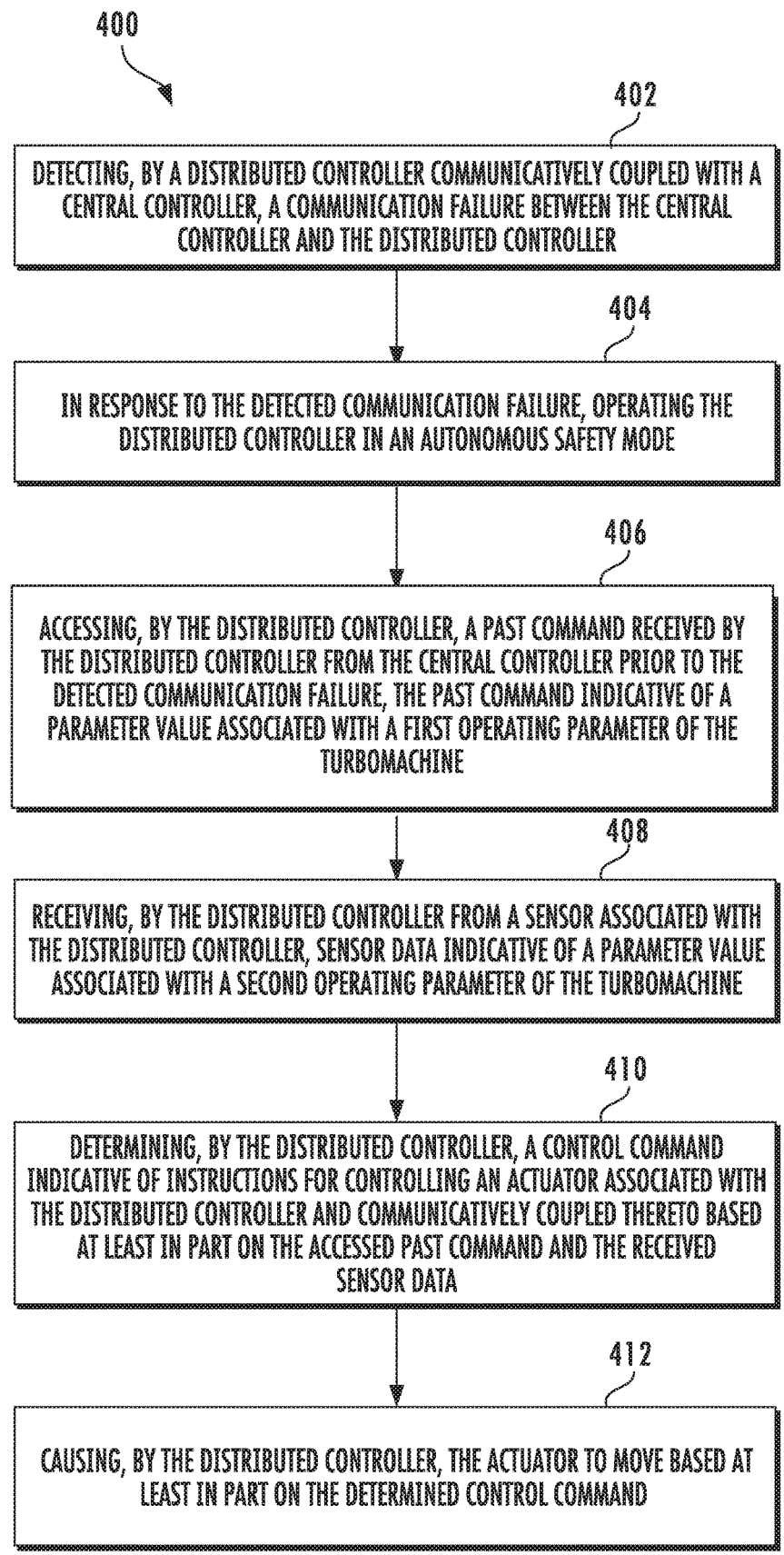
FIG. 9 provides a flow diagram of an example method of operating a distributed control system for a turbomachine in accordance with an example embodiment of the present disclosure.

FIG. 9 provides a flow diagram of an example method (400) of operating a distributed control system for a turbomachine. The method (400) of FIG. 9 can be implemented using, for instance, the distributed engine control system 350 described herein. In some implementations, the turbomachine can be a turboshaft gas turbine engine of an aerial vehicle, such as one of the turboshaft engines 100 of the aircraft 200 of FIG. 1. FIG. 9 depicts steps performed in a particular order for purposes of illustration and discussion. Those of ordinary skill in the art, using the disclosures provided herein, will understand that various steps of any of the methods disclosed herein can be modified in various ways without deviating from the scope of the present disclosure.

At (402), the method (400) includes detecting, by a distributed controller communicatively coupled with a central controller, a communication failure between the central controller and the distributed controller. For instance, the distributed controller can be the first distributed controller 370A described herein. The distributed controller can detect the communication failure between the central controller and the distributed controller in any suitable manner. For instance, the distributed controller can detect a communication failure by determining that there no further signals or commands are being received from the central controller, that the same signal or command is being received for a predetermined time thereby indicating a faulty communication link, and/or if the signal or information contained within the command is outside of a predetermined range.

At (404), in response to the detected communication failure, the method (400) includes operating the distributed controller in an autonomous safety mode. The distributed controller can operate in the autonomous safety mode as provided in (406) through (412).

At (406), the method (400) includes accessing, by the distributed controller, a past command received by the distributed controller from the central controller prior to the detected communication failure, the past command indicative of a parameter value associated with a first operating parameter of the turbomachine. In some implementations, the accessed past command is a last received command from the central controller prior to the detected communication failure. In other implementations, the accessed past command is a command received from the central controller prior to the detected communication failure that has a confidence score greater than a predetermined threshold.

At (408), the method (400) includes receiving, by the distributed controller from a sensor associated with the distributed controller, sensor data indicative of a parameter value associated with a second operating parameter of the turbomachine.

At (410), the method (400) includes determining, by the distributed controller, a control command indicative of instructions for controlling an actuator associated with the distributed controller and communicatively coupled thereto based at least in part on the accessed past command and the received sensor data. In some implementations, determining, by the distributed controller, the control command indicative of instructions for controlling the actuator associated with the distributed controller and communicatively coupled thereto at (410) comprises: determining a calculated value based at least in part on the parameter value associated with a first operating parameter of the turbomachine and the parameter value associated with the second operating parameter of the turbomachine; correlating the determined calculated value with a scheduled actuator position associated with the determined calculated value; and wherein the distributed controller determines the control command indicative of instructions for controlling the actuator associated with the distributed controller and communicatively coupled thereto based at least in part on the determined calculated value.

In some implementations, the turbomachine defines an inlet and has a spool rotatable about an axis of rotation. In such implementations, the parameter value associated with the first operating parameter of the turbomachine is an inlet temperature at the inlet of the turbomachine, the parameter value associated with the second operating parameter of the turbomachine is a sensed core speed of the spool, and the calculated value is indicative of a corrected core speed of the turbomachine.

At (412), the method (400) includes causing, by the distributed controller, the actuator to move based at least in part on the determined control command. In some implementations, the actuator associated with the distributed controller is at least one of: a fuel flow actuator that, when caused to move by the distributed controller, changes a fuel flow into a combustion chamber defined by a combustor of the turbomachine; a variable geometry actuator that, when caused to move by the distributed controller, changes a mass flow through a flowpath of the turbomachine; and a bleed valve actuator that, when caused to move by the distributed controller, changes the mass flow through the flowpath of the turbomachine. In some other implementations, the actuator is one of a plurality of actuators associated with the distributed controller, and wherein the plurality of actuators associated with the distributed controller include the fuel flow actuator, the variable geometry actuator, and the bleed valve actuator.

In some implementations, the distributed control system includes a second distributed controller communicatively coupled with the central controller and the distributed controller. A second actuator is associated with the second distributed controller and is communicatively coupled thereto. A second sensor is associated with the second distributed controller and is communicatively coupled thereto. In such implementations, in response to the detected communication failure between the central controller and the distributed controller, the method (400) further includes receiving, by the distributed controller from the second distributed controller, data indicative of a parameter value associated with a third operating parameter of the turbomachine. The method (400) further includes causing, by the distributed controller, the actuator to move based at least in part on the received data indicative of the parameter value associated with the third operating parameter of the turbomachine.

Figure 10:
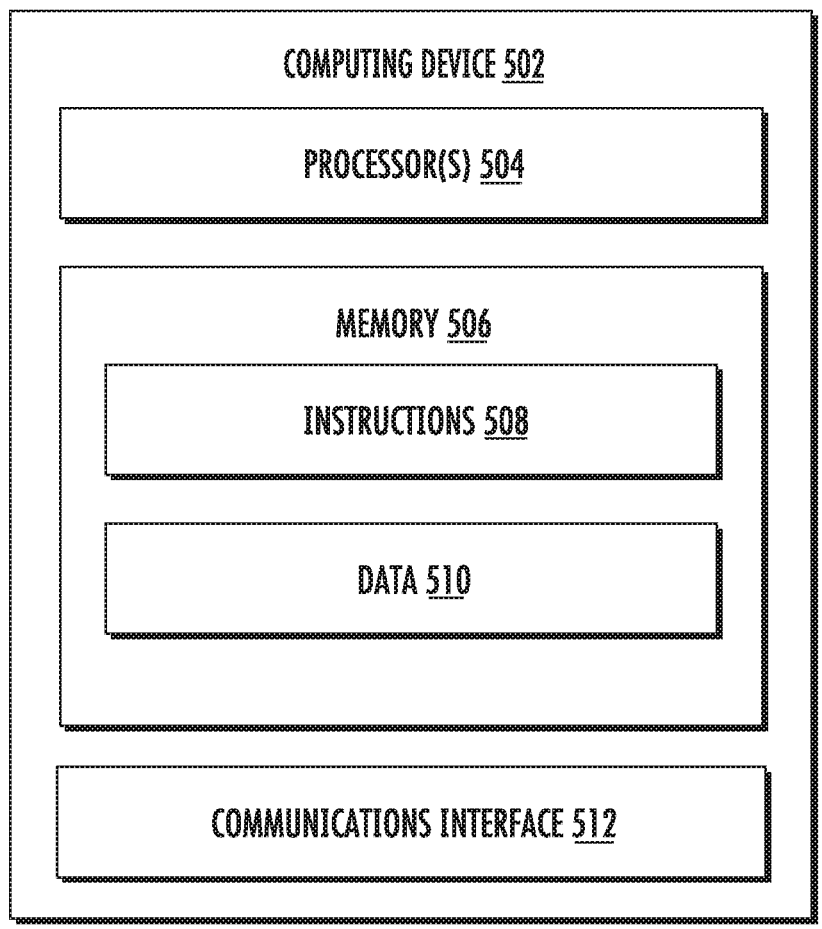
FIG. 10 provides a schematic view of a computing system for implementing one or more aspects of the present disclosure according to example embodiments of the present disclosure.

FIG. 10 provides a block diagram of an example computing device 502 that can be used to implement methods and systems described herein according to example embodiments of the present disclosure. Computing device 502 is one example of a suitable computing device for implementing the computing elements described herein. The central controller 360, the distributed controllers 370A, 370B, the vehicle computing device 310, and other computing devices of the vehicle computing system 300 noted herein can be constructed and operate in a similar manner as computing device 502.

As shown in FIG. 10, the computing device 502 can include one or more processor(s) 504 and one or more memory device(s) 506. The one or more processor(s) 504 can include any suitable processing device, such as a microprocessor, microcontroller, integrated circuit, logic device, or other suitable processing device. The one or more memory device(s) 506 can include one or more computer-readable media, including, but not limited to, non-transitory computer-readable media, RAM, ROM, hard drives, flash drives, and other memory devices, such as one or more buffer devices.

The one or more memory device(s) 506 can store information accessible by the one or more processor(s) 504, including computer-readable instructions 508 that can be executed by the one or more processor(s) 504. The instructions 508 can be any set of instructions that when executed by the one or more processor(s) 504, cause the one or more processor(s) 504 to perform operations. The instructions 508 can be software written in any suitable programming language or can be implemented in hardware. In some embodiments, the instructions 508 can be executed by the one or more processor(s) 504 to cause the one or more processor(s) 504 to perform operations.

The memory device(s) 506 can further store data 510 that can be accessed by the processors 504. For example, the data 510 can include sensor data such as engine parameters, model data, logic data, etc., as described herein, past commands 390A, position schedules 340, etc. The data 510 can include one or more table(s), function(s), algorithm(s), model(s), equation(s), etc. according to example embodiments of the present disclosure.

The one or more computing device(s) 502 can also include a communication interface 512 used to communicate, for example, with the other components of system. The communication interface 512 can include any suitable components for interfacing with one or more network(s), including for example, transmitters, receivers, ports, controllers, antennas, or other suitable components.

Figure 11:
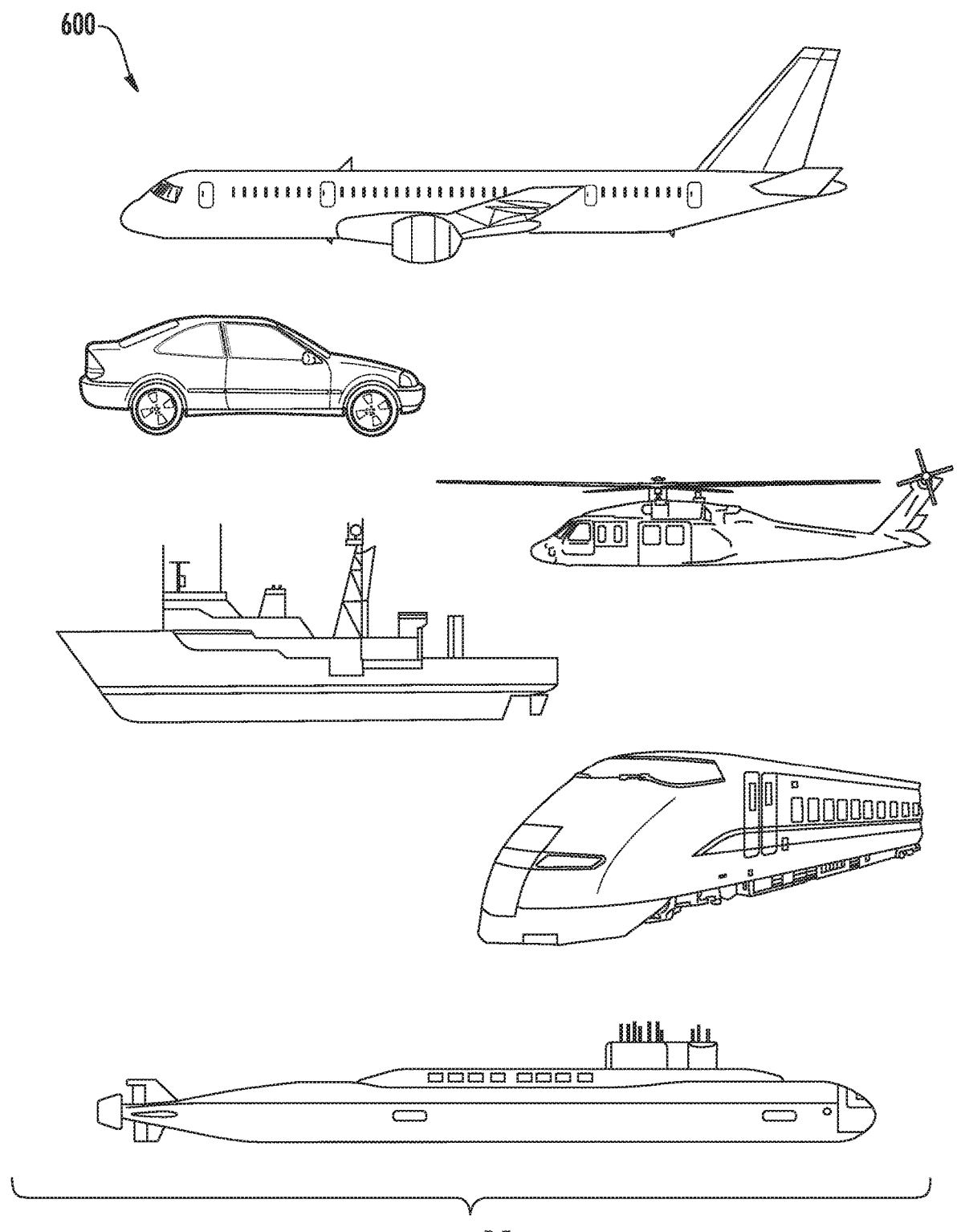
FIG. 11 provides example vehicles according to example embodiments of the present disclosure.

FIG. 11 provides example vehicles 600 according to example embodiments of the present disclosure. The systems and methods of the present disclosure can be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A distributed control system for a turbomachine, the distributed control system comprising: a central controller; a distributed controller communicatively coupled with the central controller; an actuator associated with the distributed controller and communicatively coupled thereto; a sensor associated with the distributed controller and communicatively coupled thereto, and wherein in response to a detected communication failure between the central controller and the distributed controller, the distributed controller is configured to: access a past command received by the distributed controller from the central controller; receive, from the sensor, sensor data; and cause the actuator to move based at least in part on the accessed past command and the received sensor data.

2. The distributed control system of any preceding clause, wherein the past command is indicative of a parameter value associated with a first operating parameter of the turbomachine and wherein the sensor data is indicative of a parameter value associated with a second operating parameter of the turbomachine.

3. The distributed control system of any preceding clause, wherein the turbomachine defines an inlet and has a spool rotatable about an axis of rotation, and wherein the parameter value associated with the first operating parameter of the turbomachine is an inlet temperature at the inlet of the turbomachine and the parameter value associated with the second operating parameter of the turbomachine is a sensed core speed of the spool.

4. The distributed control system of any preceding clause, wherein in causing the actuator to move based at least in part on the accessed past command and the received sensor data, the distributed controller is configured to: determine a corrected core speed based at least in part on the inlet temperature at the inlet of the turbomachine and the sensed core speed of the spool; correlate the determined corrected core speed with a scheduled actuator position associated with the determined corrected speed; and determine a control command indicative of instructions for actuating the actuator associated with the distributed controller based on the correlated scheduled actuator position, and wherein the distributed controller causes the actuator to move based at least in part on the determined control command.

5. The distributed control system of any preceding clause, wherein the actuator is at least one of a fuel flow actuator, a variable geometry actuator, and a bleed valve actuator.

6. The distributed control system of any preceding clause, further comprising: a second distributed controller communicatively coupled with the central controller and the distributed controller; a second actuator associated with the second distributed controller and communicatively coupled thereto; a second sensor associated with the second distributed controller and communicatively coupled thereto, and wherein in response to the detected communication failure between the central controller and the distributed controller, the distributed controller is configured to: receive, from the second distributed controller, data indicative of a parameter value associated with a third operating parameter of the turbomachine, and cause the actuator to move based at least in part on the received data indicative of the parameter value associated with the third operating parameter of the turbomachine.

7. The distributed control system of any preceding clause, wherein the accessed past command is a last received command from the central controller prior to the detected communication failure.

8. The distributed control system of any preceding clause, wherein the accessed past command is a command received from the central controller prior to the detected communication failure that has a confidence score greater than a predetermined threshold.

9. The distributed control system of any preceding clause, wherein the turbomachine is a gas turbine engine of an aerial vehicle.

10. A method of operating a distributed control system for a turbomachine, the method comprising: detecting, by a distributed controller communicatively coupled with a central controller, a communication failure between the central controller and the distributed controller; in response to the detected communication failure, operating the distributed controller in an autonomous safety mode, wherein operating the distributed controller in the autonomous safety mode comprises: accessing, by the distributed controller, a past command received by the distributed controller from the central controller prior to the detected communication failure, the past command indicative of a parameter value associated with a first operating parameter of the turbomachine; receiving, by the distributed controller from a sensor associated with the distributed controller, sensor data indicative of a parameter value associated with a second operating parameter of the turbomachine; determining, by the distributed controller, a control command indicative of instructions for controlling an actuator associated with the distributed controller and communicatively coupled thereto based at least in part on the accessed past command and the received sensor data; and causing, by the distributed controller, the actuator to move based at least in part on the determined control command.

11. The method of any preceding clause, wherein determining, by the distributed controller, the control command indicative of instructions for controlling the actuator associated with the distributed controller and communicatively coupled thereto comprises: determining a calculated value based at least in part on the parameter value associated with a first operating parameter of the turbomachine and the parameter value associated with the second operating parameter of the turbomachine; correlating the determined calculated value with a scheduled actuator position associated with the determined calculated value; and wherein the distributed controller determines the control command indicative of instructions for controlling the actuator associated with the distributed controller and communicatively coupled thereto based at least in part on the determined calculated value.

12. The method of any preceding clause, wherein the turbomachine defines an inlet and has a spool rotatable about an axis of rotation, and wherein the parameter value associated with the first operating parameter of the turbomachine is an inlet temperature at the inlet of the turbomachine, the parameter value associated with the second operating parameter of the turbomachine is a sensed core speed of the spool, and the calculated value is indicative of a corrected core speed of the turbomachine.

13. The method of any preceding clause, wherein the actuator associated with the distributed controller is at least one of: a fuel flow actuator that, when caused to move by the distributed controller, changes a fuel flow into a combustion chamber defined by a combustor of the turbomachine; a variable geometry actuator that, when caused to move by the distributed controller, changes a mass flow through a flowpath of the turbomachine; and a bleed valve actuator that, when caused to move by the distributed controller, changes the mass flow through the flowpath of the turbomachine.

14. The method of any preceding clause, wherein the actuator is one of a plurality of actuators associated with the distributed controller, and wherein the plurality of actuators associated with the distributed controller include the fuel flow actuator, the variable geometry actuator, and the bleed valve actuator.

15. The method of any preceding clause, wherein the turbomachine is a turboshaft gas turbine engine of an aerial vehicle.

16. A vehicle, comprising: a gas turbine engine; a distributed control system operable to control the gas turbine engine during operation, the distributed control system comprising: a central controller; a distributed control node having a distributed controller, an actuator, and a sensor, wherein the distributed controller is communicatively coupled with the central controller and the actuator and the sensor are communicatively coupled with the distributed controller, and wherein the distributed controller is configured to: detect a communication failure between the central controller and the distributed controller; in response to the detected communication failure between the central controller and the distributed controller, the distributed controller transitions to an autonomous safety mode in which the distributed controller is configured to: access a past command received by the distributed controller from the central controller, the past command being indicative of a parameter value associated with a first operating parameter of the gas turbine engine; receive, from the sensor, sensor data indicative of a parameter value associated with a second operating parameter of the gas turbine engine; and control movement of the actuator based at least in part on the accessed past command and the received sensor data.

17. The vehicle of any preceding clause, wherein in controlling movement of the actuator based at least in part on the accessed past command and the received sensor data, the distributed controller is configured to: determine a calculated value based at least in part on the parameter value associated with the first operating parameter and the parameter value associated with the second operating parameter of the gas turbine engine; correlate the determined calculated value with a scheduled actuator position associated with the determined calculated value; and determine a control command indicative of instructions for actuating the actuator of the distributed control node based at least in part on the correlated scheduled actuator position, and wherein the distributed controller moves the actuator toward the correlated scheduled actuator position based at least in part on the determined control command.

18. The vehicle of any preceding clause, wherein the gas turbine engine defines an inlet and has a spool rotatable about an axis of rotation, and wherein the parameter value associated with the first operating parameter of the turbomachine is an inlet temperature at the inlet of the gas turbine engine, the parameter value associated with the second operating parameter of the gas turbine engine is a sensed core speed of the spool, and the calculated value is indicative of a corrected core speed of the gas turbine engine.

19. The vehicle of any preceding clause, wherein when the distributed controller is operating in the autonomous safety mode, the distributed controller is configured to: detect a restored communication between the central controller and the distributed controller; in response to the detected restored communication between the central controller and the distributed controller, the distributed controller transitions from the autonomous safety mode to a normal mode in which the distributed controller is configured to: send, to the central controller, data indicative of a current actuator position of the actuator.

20. The vehicle of any preceding clause, wherein the vehicle is an aircraft.

What is claimed is:

1. A distributed control system for a turbomachine, the distributed control system comprising:

a central controller;

a distributed controller communicatively coupled with the central controller;

an actuator associated with the distributed controller and communicatively coupled thereto;

a sensor associated with the distributed controller and communicatively coupled thereto, and wherein in response to a detected communication failure between the central controller and the distributed controller, the distributed controller transitions to an autonomous safety mode in which the distributed controller is configured to:

access a past command received by the distributed controller from the central controller;

receive, from the sensor, sensor data; and cause the actuator to move based at least in part on the accessed past command and the received sensor data.

2. The distributed control system of claim 1, wherein the past command is indicative of a parameter value associated with a first operating parameter of the turbomachine and wherein the sensor data is indicative of a parameter value associated with a second operating parameter of the turbomachine.

3. The distributed control system of claim 2, wherein the turbomachine defines an inlet and has a spool rotatable about an axis of rotation, and wherein the parameter value associated with the first operating parameter of the turbomachine is an inlet temperature at the inlet of the turbomachine and the parameter value associated with the second operating parameter of the turbomachine is a sensed core speed of the spool.

4. The distributed control system of claim 3, wherein in causing the actuator to move based at least in part on the accessed past command and the received sensor data, the distributed controller is configured to:

determine a corrected core speed based at least in part on the inlet temperature at the inlet of the turbomachine and the sensed core speed of the spool;

correlate the determined corrected core speed with a scheduled actuator position associated with the determined corrected speed; and determine a control command indicative of instructions for actuating the actuator associated with the distributed controller based on the correlated scheduled actuator position, and wherein the distributed controller causes the actuator to move based at least in part on the determined control command.

5. The distributed control system of claim 1, wherein the actuator is at least one of a fuel flow actuator, a variable geometry actuator, and a bleed valve actuator.

6. The distributed control system of claim 1, further comprising:

a second distributed controller communicatively coupled with the central controller and the distributed controller;

a second actuator associated with the second distributed controller and communicatively coupled thereto;

a second sensor associated with the second distributed controller and communicatively coupled thereto, and wherein in response to the detected communication failure between the central controller and the distributed controller, the distributed controller is configured to:

receive, from the second distributed controller, data indicative of a parameter value associated with a third operating parameter of the turbomachine, and cause the actuator to move based at least in part on the received data indicative of the parameter value associated with the third operating parameter of the turbomachine.

7. The distributed control system of claim 1, wherein the accessed past command is a last received command from the central controller prior to the detected communication failure.

8. The distributed control system of claim 1, wherein the accessed past command is a command received from the central controller prior to the detected communication failure that has a confidence score greater than a predetermined threshold.

9. The distributed control system of claim 1, wherein the turbomachine is a gas turbine engine of an aerial vehicle.

10. A method of operating a distributed control system for a turbomachine, the method comprising:

detecting, by a distributed controller communicatively coupled with a central controller, a communication failure between the central controller and the distributed controller;

in response to the detected communication failure, operating the distributed controller in an autonomous safety mode, wherein operating the distributed controller in the autonomous safety mode comprises:

accessing, by the distributed controller, a past command received by the distributed controller from the central controller prior to the detected communication failure, the past command indicative of a parameter value associated with a first operating parameter of the turbomachine;

receiving, by the distributed controller from a sensor associated with the distributed controller, sensor data indicative of a parameter value associated with a second operating parameter of the turbomachine;

determining, by the distributed controller, a control command indicative of instructions for controlling an actuator associated with the distributed controller and communicatively coupled thereto based at least in part on the accessed past command and the received sensor data; and causing, by the distributed controller, the actuator to move based at least in part on the determined control command.

11. The method of claim 10, wherein determining, by the distributed controller, the control command indicative of instructions for controlling the actuator associated with the distributed controller and communicatively coupled thereto comprises:

determining a calculated value based at least in part on the parameter value associated with a first operating parameter of the turbomachine and the parameter value associated with the second operating parameter of the turbomachine;

correlating the determined calculated value with a scheduled actuator position associated with the determined calculated value; and wherein the distributed controller determines the control command indicative of instructions for controlling the actuator associated with the distributed controller and communicatively coupled thereto based at least in part on the determined calculated value.

12. The method of claim 11, wherein the turbomachine defines an inlet and has a spool rotatable about an axis of rotation, and wherein the parameter value associated with the first operating parameter of the turbomachine is an inlet temperature at the inlet of the turbomachine, the parameter value associated with the second operating parameter of the turbomachine is a sensed core speed of the spool, and the calculated value is indicative of a corrected core speed of the turbomachine.

13. The method of claim 10, wherein the actuator associated with the distributed controller is at least one of:
a fuel flow actuator that, when caused to move by the distributed controller, changes a fuel flow into a combustion chamber defined by a combustor of the turbomachine;
a variable geometry actuator that, when caused to move by the distributed controller, changes a mass flow through a flowpath of the turbomachine; and
a bleed valve actuator that, when caused to move by the distributed controller, changes the mass flow through the flowpath of the turbomachine.

14. The method of claim 13, wherein the actuator is one of a plurality of actuators associated with the distributed controller, and wherein the plurality of actuators associated with the distributed controller include the fuel flow actuator, the variable geometry actuator, and the bleed valve actuator.

15. The method of claim 10, wherein the turbomachine is a turboshaft gas turbine engine of an aerial vehicle.

16. A vehicle, comprising:
a gas turbine engine;
a distributed control system operable to control the gas turbine engine during operation, the distributed control system comprising:
a central controller;
a distributed control node having a distributed controller, an actuator, and a sensor, wherein the distributed controller is communicatively coupled with the central controller and the actuator and the sensor are communicatively coupled with the distributed controller, and
wherein the distributed controller is configured to:
detect a communication failure between the central controller and the distributed controller;
in response to the detected communication failure between the central controller and the distributed controller, the distributed controller transitions to an autonomous safety mode in which the distributed controller is configured to:
access a past command received by the distributed controller from the central controller, the past command being indicative of a parameter value associated with a first operating parameter of the gas turbine engine;
receive, from the sensor, sensor data indicative of a parameter value associated with a second operating parameter of the gas turbine engine; and
control movement of the actuator based at least in part on the accessed past command and the received sensor data.

17. The vehicle of claim 16, wherein in controlling movement of the actuator based at least in part on the accessed past command and the received sensor data, the distributed controller is configured to:
determine a calculated value based at least in part on the parameter value associated with the first operating parameter and the parameter value associated with the second operating parameter of the gas turbine engine;
correlate the determined calculated value with a scheduled actuator position associated with the determined calculated value; and
determine a control command indicative of instructions for actuating the actuator of the distributed control node based at least in part on the correlated scheduled actuator position, and
wherein the distributed controller moves the actuator toward the correlated scheduled actuator position based at least in part on the determined control command.

18. The vehicle of claim 17, wherein the gas turbine engine defines an inlet and has a spool rotatable about an axis of rotation, and
wherein the parameter value associated with the first operating parameter of the turbomachine is an inlet temperature at the inlet of the gas turbine engine, the parameter value associated with the second operating parameter of the gas turbine engine is a sensed core speed of the spool, and the calculated value is indicative of a corrected core speed of the gas turbine engine.

19. The vehicle of claim 16, wherein when the distributed controller is operating in the autonomous safety mode, the distributed controller is configured to:
detect a restored communication between the central controller and the distributed controller;
in response to the detected restored communication between the central controller and the distributed controller, the distributed controller transitions from the autonomous safety mode to a normal mode in which the distributed controller is configured to:
send, to the central controller, data indicative of a current actuator position of the actuator.

20. The vehicle of claim 16, wherein the vehicle is an aircraft.

* * * * *